United States Patent [19]

Sokolov

[11] 4,253,310

[45] Mar. 3, 1981

[54] METHOD AND APPARATUS FOR AIR CONDITIONING MOTOR VEHICLES

[75] Inventor: Mordechai Sokolov, Houston, Tex.

[73] Assignee: Ramot University Authority for Applied Research & Industrial Develop. Ltd., Tel Aviv, Israel

[21] Appl. No.: 884,010

[22] Filed: Mar. 6, 1978

[30] Foreign Application Priority Data

Mar. 7, 1977 [IL] Israel .................................... 51603

[51] Int. Cl.$^3$ .......................... F25B 7/00; F25B 15/00; F25B 27/02; B60H 3/04
[52] U.S. Cl. .......................................... 62/79; 62/101; 62/238 B; 62/239; 62/243
[58] Field of Search ...................... 62/238 B, 239, 243, 62/79, 101, 324

[56] References Cited

U.S. PATENT DOCUMENTS

| | | | |
|---|---|---|---|
| 2,327,451 | 8/1943 | Perrine | 62/243 |
| 2,481,520 | 9/1949 | Knoy | 62/102 |
| 2,659,214 | 11/1953 | Coggburn | 62/238 B |
| 2,783,622 | 3/1957 | Bourassa | 62/238 B |
| 3,008,303 | 11/1961 | Ruse et al. | 62/238 B |
| 3,077,083 | 2/1963 | Kubo et al. | 62/238 B |
| 3,101,599 | 8/1963 | Pippert, Sr. et al. | 62/238 B |
| 3,661,200 | 5/1972 | McNamara | 62/238 B |

*Primary Examiner*—Lloyd L. King
*Attorney, Agent, or Firm*—Benjamin J. Barish

[57] ABSTRACT

A method and apparatus are described for air conditioning motor vehicles by the use of an absorption-type system, wherein: a concentrated solution is introduced into the vehicle engine block, causing a volatile refrigerant in the solution to be evaporated; during a cooling mode, the evaporated refrigerant is condensed, the heat so produced being rejected externally to the automobile, the pressure of the refrigerant is reduced to reevaporate it and thereby to cool the motor vehicle interior, the pressure of the dilute solution leaving the automobile engine block is reduced, the refrigerant is remixed to reconstitute the concentrated solution, and the so reconcentrated solution is repressurized and recycled to the engine block; and utilizing the dilute solution from the engine block during the heating mode for heating the motor vehicle interior by directing the dilute solution into heat-exchange relationship with the interior of the motor vehicle, while accumulating in the condenser the refrigerant leaving the engine block.

15 Claims, 2 Drawing Figures

METHOD AND APPARATUS FOR AIR CONDITIONING MOTOR VEHICLES

BACKGROUND OF THE INVENTION

The present invention relates to a method and apparatus for air conditioning motor vehicles.

The presently used systems for air conditioning motor vehicles usually include a compressor for increasing the pressure of the refrigerant gas to a point where liquefaction may occur in the condenser. Compressor-type air conditioners, however, have a number of drawbacks when used in motor vehicles. One serious drawback is that they reduce the driving power output of the vehicle engine to such an extent that compressor-type air conditioners can normally be used only with automobiles having relatively large engines. In addition, compressor-type air conditioners increase the fuel consumption as much as 15% or 20%. Further, they are relatively expensive and require continuous maintenance.

There have been prior proposals to air condition motor vehicles by the use of absorption-type systems, wherein heat, rather than mechanical work, is used as the primary energy source for the refrigeration cycle. These previously proposed absorption-type air conditioners generally used heat-exchangers for extracting heat, either from the vehicle radiator, or from the hot engine exhaust gases, or from both. However, they were generally found not commercially satisfactory for a number of reasons. Thus, the extraction of heat from hot exhaust gases requires a large heat transfer area. In addition, heat-exchangers produce a pressure drop in the vehicle exhaust pipe system, thereby reducing engine efficiency. Further, the extraction of heat from hot exhaust gases produces serious corrosion problems.

On the other hand, it has been found impractical to utilize the radiator as a sole source of energy because of its relatively low temperature, although the quantity of heat present there is quite high.

BRIEF SUMMARY OF THE INVENTION

An object of the present invention is to provide a new method and apparatus, based on an absorption system, for air conditioning a motor vehicle.

According to one aspect of the present invention, there is provided a method for air conditioning a motor vehicle by selectively cooling or heating same during a cooling mode and a heating mode of operation, respectively, comprising: introducing into the vehicle engine block a concentrated solution of a solvent and a volatile refrigerant for heating same to evaporate volatile refrigerant from the concentrated solution, thereby leaving a dilute solution; utilizing the evaporated refrigerant from the engine block during the cooling mode for cooling the motor vehicle interior by condensing the evaporated refrigerant and rejecting the heat so produced external to the automobile, reducing the pressure of the refrigerant to reevaporate same and to cool thereby the motor vehicle interior, reducing the pressure of the dilute solution leaving the automobile engine block, remixing the refrigerant in the dilute solution to reconstitute the concentrated solution, repressurizing and recycling the reconstituted concentrated solution to the engine block; and utilizing the dilute solution from the engine block to heat the motor vehicle during the heating mode, by directing said dilute solution into heat-exchange relationship with the motor vehicle interior while accumulating in said condenser the refrigerant leaving the engine block.

According to another aspect of the invention, there is provided apparatus for air conditioning a motor vehicle, comprising: conduit means for introducing into the vehicle engine block a concentrated solution of a solvent and a volatile refrigerant, which refrigerant is evaporated from the concentrated solution by the heated generated in the engine block, thereby leaving a dilute solution; a condenser condensing the evaporated refrigerant and rejecting the heat so produced external to the automobile; an expansion device reducing the pressure of the condensed refrigerant; an evaporator evaporating the condensed refrigerant and cooling thereby the motor vehicle interior; a liquid regulating device reducing the pressure of the dilute solution; an absorber remixing said dilute solution from the engine block and the refrigerant from the evaporator to reconstitute the concentrated solution; return conduit means including a pump for recycling the remixed solution back to the engine block under pressure; and control means for selectively controlling the apparatus to operate according to a "cooling" mode to cool the interior of the motor vehicle, or a "heating" mode to heat the interior of the motor vehicle; said control means including valve and by-pass means effective during the cooling mode to utilize the evaporated refrigerant to cool the interior of the vehicle by directing same to said condenser, expansion device and evaporator; said valve and by-pass means being effective during the heating mode to utilize the dilute solution from the engine block to heat the interior of the motor vehicle while accumulating in said condenser the refrigerant leaving the engine block.

In the preferred embodiment of the invention described below, the absorber replaces the automobile radiator or is a modification thereof.

In one described embodiment, the apparatus includes a heater, said valve and by-pass means directing the dilute solution from the engine block through the heater during the heating mode of operation. More particularly, the latter means comprises a by-pass line from the dilute solution exit of the engine block, to the heater, and back to the concentrated solution inlet to the engine block, a first control valve in said by-pass line effective to enable same during the heating mode, and a second control valve between the condenser and the evaporator and effective to disconnect the evaporator during the heating and off modes, thereby to cause the refrigerant to accumulate in the condenser.

In a second, less-expensive, described embodiment, a separate heater is not provided, and instead, the condenser is used for heating the interior of the motor vehicle. In this embodiment, the apparatus includes a line between the dilute solution outlet of the engine block and the inlet end of the evaporator, the first control valve in said latter line which valve is closed during the cooling and off modes, and open during the heating mode; and a second control valve between the condenser and the evaporator which valve is open during the cooling mode and closed during the heating and off modes.

Further features and advantages of the invention will be apparent from the description below.

BRIEF DESCRIPTION OF THE DRAWINGS

The invention is herein described, somewhat diagrammatically and by way of example only, with reference to FIGS. 1 and 2 of the drawings which schematically illustrate two preferred embodiments of the invention.

DESCRIPTION OF THE PREFERRED EMBODIMENTS

Figure 1:
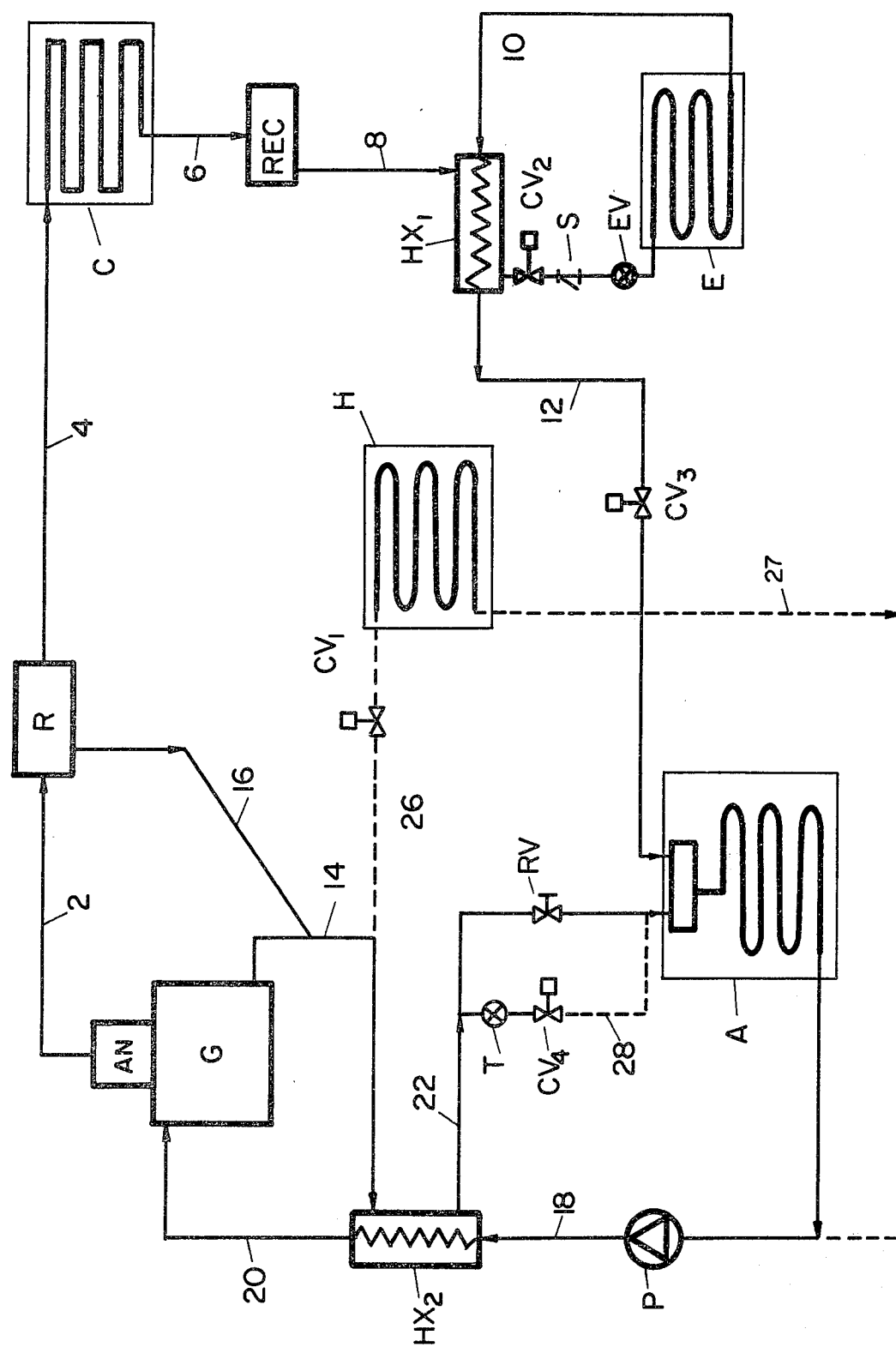

With reference to FIG. 1, the vehicle engine block is schematically illustrated at G, and constitutes the generator of the system. A circulation pump P, which may be the conventional cooling water pump provided in existing vehicle engines or a modification of it, introduces into the vehicle engine block G, under pressure, a concentrated solution of a solvent and a volatile refrigerant. As an example, the solvent may be DME-TEG (Dimethyl Ether-Tetra Ethylene Glycol) and the volatile refrigerant may be Dichloromonofluoromethane (commonly called "Refrigerant 21", or "Freon 21"). This solution is used for the normal cooling of the engine block, so that it is heated by the heat generated within the engine block. The same solution may also be used, in the "heating" mode of operation, for heating the interior of the motor vehicle. The selection of the mode of operation of the system is determined by four control valves $CV_1-CV_4$, as will be described below.

The heat generated within the engine block G causes refrigerant to evaporate. The evaporated refrigerant passes through an analyser AN, separating solvent droplets from the refrigerant vapour, and exits via a line 2 to a rectifier R, which is a reflux condenser. The refrigerant vapour then passes through line 4 to a condenser C.

The refrigerant vapour is condensed in condenser C and passes through an output line 6 to a receiver REC for accumulating surplus refrigerant during the operation of the system, and for compensating for minor leaks of refrigerant to the atmosphere. The condensed refrigerant then passes via line 8 to a heat-exchanger $HX_1$, and from there, via control valve $CV_2$, a strainer S and an expansion device EV to an evaporator E. Strainer S filters condensed refrigerant flowing in the liquid line 8, and expansion device EV reduces the pressure of the condensed refrigerant gas such that part evaporates there and the remainder evaporates in the evaporator E. The gas vapour exits from evaporator E via line 10 and flows back through the heat-exchanger $HX_1$, and from there, via line 12 and control valve $CV_2$ to the absorber A.

The evaporation of the refrigerant gas in evaporator E extracts heat from the interior of the motor vehicle, and thereby cools it. In heat-exchanger $HX_1$, the cold evaporated refrigerant exiting from the evaporator E is used to cool the hot liquid refrigerant exiting from the condenser C and the receiver REC via line 8. This lowers the enthalpy of the liquid refrigerant so that it can absorb more heat in the evaporator from the interior of the motor vehicle.

In absorber A, the gaseous refrigerant from the evaporator E is remixed with the dilute solution from the engine block G in order to reconstitute the original concentrated solution before the latter is recycled back into the engine block. Thus, the dilute solution leaves the engine block via outlet line 14, has added thereto the dilute solution separated in the rectifier R and supplied thereto via line 16, and is then passed through a heat-exchanger $HX_2$ where its heat is used for preheating the reconstituted concentrated solution passing through the heat exchanger to the engine block via lines 18 and 20. The dilute solution exiting from the heat exchanger $HX_2$ passes via line 22 to a regulating valve EV where its pressure is reduced before being introduced into the absorber A with the gaseous refrigerant. The concentrated solution reconstituted in absorber A is recycled by circulation pump P through heat-exchanger $HX_2$ back into the engine block G via inlet line 20 as described above.

The system, insofar as described above, will thus operate in a "cooling" mode, whereupon the evaporator E will extract heat from the interior of the motor vehicle, while the condenser C and the absorber A will reject heat to the exterior of the motor vehicle.

In addition to the "cooling" mode of operation, the system can also operate in two other modes, namely a "heating" mode wherein the interior of the motor vehicle is heated, and an "off" mode wherein both cooling and heating are disabled.

For this purpose, the system in FIG. 1 includes a heater H and by-pass means for directing the dilute solution therethrough from the engine block during the heating mode of operation when the interior of the motor vehicle is to be heated. The by-pass arrangement includes a line 26 directing the hot dilute solution from the dilute solution outlet line 14 through control valve $CV_1$ to the heater H, and a second line 27 from the heater directly to the circulation pump P, thereby by-passing the absorber A. During the heating mode, control valve $CV_1$ is open, thereby enabling the by-pass line through the heater H; and control valve $CV_2$ between the receiver REC and the evaporator E is closed, thereby causing the refrigerant to accumulate in the condenser C or the receiver REC, and not to be circulated to the evaporator E.

The system illustrated in FIG. 1 also includes a line 28 by-passing the regulating valve RV, there being a thermostat T and a control valve $CV_4$ in line 28. The latter thermostat and control valve are effective, during the heating mode to direct all the dilute solution from the engine block G to the heater H while the engine is relatively cold, and to direct a part of the dilute solution from the engine block to the absorber after the engine has become warm.

The following table illustrates the conditions of the four control valves $CV_1-CV_4$ during each one of the three above-described modes of operation of the system:

| Valve/Mode | Cooling | Heating | Off |
| --- | --- | --- | --- |
| $CV_1$ | Closed | Open | Closed |
| $CV_2$ | Open | Closed | Closed |
| $CV_3$ | Open | Closed | Closed |
| $CV_4$ | Closed | Open | Open |

Figure 2:
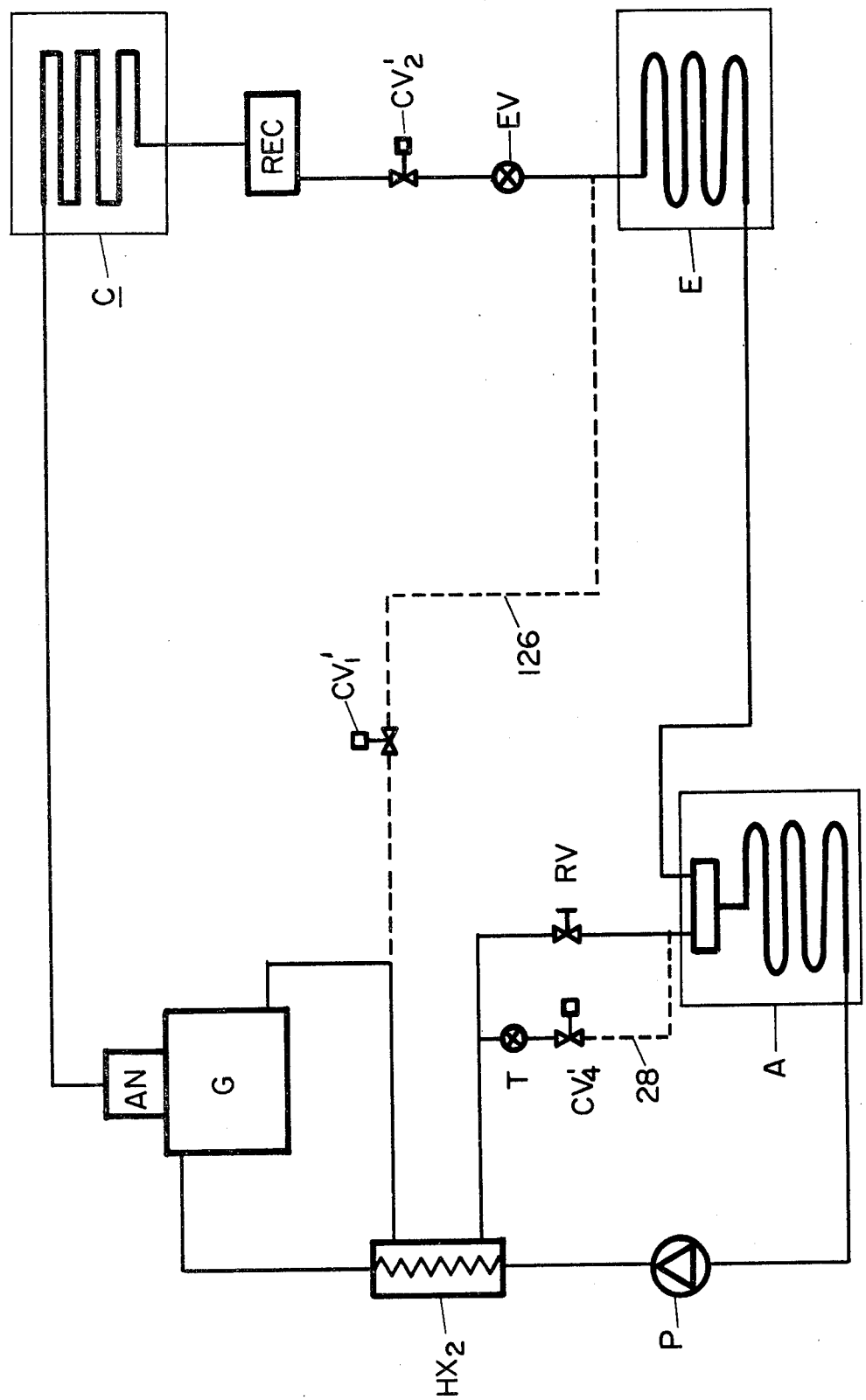

FIG. 2 illustrates a lesser-expensive arrangement that may be used still providing the three modes of operation, but obviating the need for a separate heater (corresponding to heater H, FIG. 1). Instead of the heater, the evaporator of the air conditioning system is used for heating the interior of the motor vehicle during the heating mode.

Thus, in FIG. 2, the system includes the engine block generator G, analyser AN, condenser C, receiver REC, expansion valve EV, evaporator E, regulating valve RV, absorber A, circulating pump P, and heat exchanger HX$_2$, all performing similar functions as described above with respect to FIG. 1 and therefore carrying the same reference characters. In addition, a by-pass line 28 is provided bypassing the regulating valve RV, this line including a thermostat T and a control valve CV$_4'$, as in the correspondingly identified elements in FIG. 1.

In the system of FIG. 2, however, a line 126 is provided between the dilute solution exit of the engine block G and the inlet of the evaporator E. This bypass line includes a control valve CV$_1'$ which is closed during the cooling and off modes and opened during the heating mode. In addition, a second control valve CV$_2'$ is provided between the condenser C and evaporator E at a point upstream of line 126, control valve CV$_2'$ being open during the cooling mode and closed during the heating and off modes.

It will thus be seen that during the cooling mode, control CV$_2'$ is opened permitting the refrigerant gas from the condenser C and receiver REC to be fed, after expansion in valve EV, to the evaporator E where it effects the cooling of the interior of the motor vehicle as described above. However, in the heating mode, control valve CV$_2'$ is closed and control valve CV$_1'$ is opened, thereby causing the gaseous refrigerant to accumulate in the condenser C and the receiver REC, and the hot dilute solution exiting from the engine block to be fed to the evaporator where it heats the interior of the motor vehicle and then returns to the engine block via the absorber A and the heat-exchanger HX$_2$.

Many other variations, modifications and applications of the invention will be apparent.

What is claimed is:

1. A method for air conditioning a motor vehicle by selectively cooling or heating same during a cooling mode and a heating mode of operation, respectively, comprising: introducing into the vehicle engine block a concentrated solution of a solvent and a volatile refrigerant for heating same to evaporate volatile refrigerant from the concentrated solution, thereby leaving a dilute solution; utilizing the evaporated refrigerant from the engine block during the cooling mode for cooling the motor vehicle interior by condensing the evaporated refrigerant and rejecting the heat so produced external to the automobile, reducing the pressure of the refrigerant to reevaporate same and to cool thereby the motor vehicle interior, reducing the pressure of the dilute solution leaving the automobile engine block, remixing the refrigerant in the dilute solution to reconstitute the concentrated solution, repressurizing and recycling the reconstituted concentrated solution to the engine block; and utilizing the dilute solution from the engine block to heat the motor vehicle during the heating mode, by directing said dilute solution into heat-exchange relationship with the motor vehicle interior while accumulating in said condenser the refrigerant leaving the engine block.

2. A method according to claim 1 wherein, during the heating mode, the dilute solution leaving the engine block is directed to a heater, and is then repressurized and recycled back to the engine block.

3. A method according to claim 1 wherein, during the heating mode, the dilute solution leaving the engine block is directed to an evaporator in which the refrigerant reevaporation takes place during the cooling mode of operation, and then to an absorber, in which the remixing of the refrigerant and dilute solution takes place during the cooling mode.

4. Apparatus for air conditioning a motor vehicle, comprising: conduit means for introducing into the vehicle engine block a concentrated solution of a solvent and a volatile refrigerant, which refrigerant is evaporated from the concentrated solution by the heat generated in the engine block, thereby leaving a dilute solution; a condenser condensing the evaporated refrigerant and rejecting the heat so produced external to the automobile; an expansion device reducing the pressure of the condensed refrigerant; an evaporator evaporating the condensed refrigerant and cooling thereby the motor vehicle interior; a liquid regulating device reducing the pressure of the dilute solution; an absorber remixing said dilute solution from the engine block and the refrigerant from the evaporator to reconstitute the concentrated solution; return conduit means including a pump for recycling the remixed solution back to the engine block under pressure; and control means for selectively controlling the apparatus to operate according to a "cooling" mode to cool the interior of the motor vehicle, or a "heating" mode to heat the interior of the motor vehicle; said control means including valve and by-pass means effective during the cooling mode to utilize the evaporated refrigerant to cool the interior of the vehicle by directing same to said condenser, expansion device and evaporator; said valve and by-pass means being effective during the heating mode to utilize the dilute solution from the engine block to heat the interior of the motor vehicle while accumulating in said condenser the refrigerant leaving the engine block.

5. Apparatus according to claim 4, wherein said absorber replaces the motor vehicle radiator or is a modification thereof.

6. Apparatus according to claim 4 further including an analyser between the engine block and the condenser for separating dilute solution from the evaporated refrigerant and directing said dilute solution to the absorber during the cooling mode.

7. Apparatus according to claim 4, further including a receiver at the outlet of the condenser for accumulating the condensed refrigerant.

8. Apparatus according to claim 4, further including a heat-exchanger between the absorber and the engine block, which heat-exchanger utilizes, during the cooling mode, the hot dilute solution leaving the engine block for preheating the concentrated solution from the absorber before the same is recycled back to the engine block.

9. Apparatus according to claim 4, further including a heat-exchanger between the condenser and said expansion device, which latter heat-exchanger uses, during the cooling mode, the cold evaporated refrigerant from the evaporator for cooling the hot liquid refrigerant from the condenser.

10. Apparatus according to claim 4, wherein said control means also selectively controls the apparatus to operate according to an "off" mode, wherein said valve-and-by-pass means directs the dilute solution through the absorber and back to the engine block while accumulating in said condenser the refrigerant from the engine block.

11. Apparatus according to claim 10, further including a heater, said valve and by-pass means for directing the dilute solution from the engine block through the heater during the heating made of operation, said by-pass means comprising a by-pass line from the dilute solution exit of the engine block, to the heater, and back to the concentrated solution inlet to the engine block, a first control valve in said by-pass line effective to enable same during the heating mode, and a second control valve between the condenser and the evaporator and effective to disconnect the evaporator during the heating and off modes, thereby to cause the refrigerant to accumulate in the condenser.

12. Apparatus according to claim 11, further including a third control valve between the evaporator and the absorber and effective to disconnect the absorber from the evaporator during the heating and off modes.

13. Apparatus according to claim 12, further including a thermostat and a fourth control valve effective, during the heating mode, to direct all the dilute solution from the engine block to the heater while the engine is relatively cold, and to direct a part of the dilute solution from the engine block to the absorber after the engine has become warm.

14. Apparatus according to claim 4, further including a strainer between the condenser and the evaporator.

15. Apparatus according to claim 10, wherein said valve and by-pass means include a line between the dilute solution outlet of the engine block and the inlet end of the evaporator, a first control valve in said latter line which valve is closed during the cooling and off modes, and open during the heating mode, and a second control valve between the condenser and the evaporator which valve is open during the cooling mode and closed during the heating mode.

* * * * *